US009447238B2

(12) United States Patent
Gao et al.

(10) Patent No.: US 9,447,238 B2
(45) Date of Patent: Sep. 20, 2016

(54) POLYPHENYLENE OXIDE RESIN, METHOD OF PREPARING POLYPHENYLENE OXIDE RESIN, POLYPHENYLENE OXIDE PREPOLYMER AND RESIN COMPOSITION

(71) Applicant: Elite Electronic Material (KunShan) Co., Ltd., Kunshan, Jiangsu Province (CN)

(72) Inventors: Yu Gao, Kunshan (CN); Chen-Yu Hsieh, Guanyin Township, Taoyuan County (TW); Ziqian Ma, Kunshan (CN); Rongtao Wang, Kunshan (CN); Wenjun Tian, Kunshan (CN)

(73) Assignee: ELITE ELECTRONIC MATERIAL (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 14/643,627

(22) Filed: Mar. 10, 2015

(65) Prior Publication Data
US 2016/0185904 A1    Jun. 30, 2016

(30) Foreign Application Priority Data
Dec. 31, 2014    (CN) .......................... 2014 1 0851821

(51) Int. Cl.
*C08G 61/00* (2006.01)
*C08G 65/48* (2006.01)
*C08L 71/12* (2006.01)
*C08K 5/5397* (2006.01)
*C08K 7/18* (2006.01)

(52) U.S. Cl.
CPC ........... *C08G 65/485* (2013.01); *C08K 5/5397* (2013.01); *C08K 7/18* (2013.01); *C08L 71/126* (2013.01); *C08L 2201/02* (2013.01)

(58) Field of Classification Search
CPC .............................. C08F 20/06; C07D 303/12
See application file for complete search history.

(56) References Cited

U.S. PATENT DOCUMENTS

| 3,761,449 A * | 9/1973 | Kaufman et al. ...... C08G 75/23 |
| | | 528/171 |
| 2008/0154006 A1* | 6/2008 | Amagai ............... C08G 59/063 |
| | | 526/317.1 |

* cited by examiner

*Primary Examiner* — Shane Fang
(74) *Attorney, Agent, or Firm* — Muncy, Geissler, Olds & Lowe, P.C.

(57) ABSTRACT

A polyphenylene oxide resin belongs to a polymerized and/or modified thermosetting polyphenylene oxide resin, having a structure represented by formula (I):

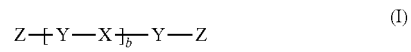

The polymerized and/or modified thermosetting polyphenylene oxide resin has better flame retardancy, thermal resistance, dielectric constant, dissipation factor, toughness, reactivity, viscosity and solubility. Therefore, the polyphenylene oxide resin is suitable for producing prepregs, resin films, laminates, printed circuit boards and other articles. A method of preparing polyphenylene oxide resins, a prepolymer thereof and a resin composition containing the polyphenylene oxide resin are also provided.

13 Claims, 4 Drawing Sheets

POLYPHENYLENE OXIDE RESIN, METHOD OF PREPARING POLYPHENYLENE OXIDE RESIN, POLYPHENYLENE OXIDE PREPOLYMER AND RESIN COMPOSITION

CROSS-REFERENCE TO RELATED APPLICATIONS

This Application claims priority to Chinese Patent Application No. 201410851821.6, filed on Dec. 31, 2014, the entirety of which is incorporated by reference herein.

FIELD OF THE INVENTION

The present invention relates to a polyphenylene oxide resin and more particularly to a thermosetting polyphenylene oxide resin with desirable overall properties. Moreover, this invention also provides a method of preparing the aforesaid polyphenylene oxide resin, a polyphenylene oxide prepolymer and a resin composition.

BACKGROUND OF THE INVENTION

With the rapid advancement of electronic technology, information processing in mobile communication, servers, cloud storage and other electronic products has incessantly directed toward high frequency signal transmission and high speed digitalization, and low dielectric resin material has become the mainstream for the development of laminates for high speed data transmission in order to satisfy the demands of high speed information transmission and processing in the cloud technology and terminal servers. Therefore, major criteria of copper-clad laminates include high reliability, high moisture/thermal resistance, low dielectric constant, low dissipation factor and high dimensional stability of the material. As such, there is a need for a high performance novel material with excellent dielectric properties for printed circuit boards.

Polyphenylene oxide (PPO or PPE) has the advantages of low dielectric constant and low dissipation factor, making it a desirable material for a high frequency PCB. However, conventional PPOs, such as dihydroxyl-terminated PPO and bis(vinylbenzyl)-terminated PPO, still fail to meet the need in use, such as one or more unsatisfactory properties including flame retardancy, thermal resistance, dielectric constant, dissipation factor, toughness, reactivity, viscosity and solubility. Therefore, there is a need for an improved PPO to meet the demands in production process and product properties.

SUMMARY OF THE INVENTION

An object of the present invention is to provide a polyphenylene oxide resin having a structure represented by formula (I)

wherein b is a positive integer (e.g. a positive integer of 1 to 20, preferably a positive integer of 1 to 5), X is selected from any one of formula (II) to formula (IV) and a combination thereof:

Y has a structure represented by formula (V):

wherein m and n independently represent a positive integer of 1 to 30; $R_1$ to $R_{16}$ are independently selected from H, —$CH_3$ and halogen atoms; A is selected from a covalent bond, —$CH_2$—, —$CH(CH_3)$—, —$C(CH_3)_2$—, —O—, —S—, —$SO_2$— and carbonyl group;

and Z has a structure of formula (VI), (VII) or (VIII) or a combination thereof:

wherein $R_{17}$ to $R_{23}$ are independently selected from H, —$CH_3$ and halogen atoms, Q and W are independently an aliphatic group, such as a $C_1$ to $C_3$ aliphatic group, and W is preferably —$CH_2$—.

In one embodiment, each of $R_{21}$ to $R_{23}$ in formula (VII) is H, and Q is —$CH_2$—, such that Z is an allyl group.

Another object of the present invention is to provide a method of preparing polyphenylene oxide resin, comprising reacting a bis(chloromethyl) compound with dihydroxyl-terminated polyphenylene oxide, followed by the addition of a vinyl compound to complete the reaction and obtain the polyphenylene oxide resin.

Another object of the present invention is to provide a polyphenylene oxide prepolymer obtained from pre-polymerization of the above-recited polyphenylene oxide resin with a double-bond-containing compound and/or a double-bond-containing resin, wherein the double-bond-containing compound and the double-bond-containing resin may independently be isocyanate, isocyanurate, maleimide, polyolefin, divinylbenzene, acrylic resin and a combination of any two or more thereof.

Still another object of the present invention is to provide a resin composition comprising: (A) the above-recited polyphenylene oxide resin, its prepolymer or a mixture thereof; and (B) at least one property modifier for modifying at least one property of the resin composition comprising flame retardancy, thermal resistance, dielectric constant, dissipation factor, toughness, reactivity, viscosity and solubility.

Said polyphenylene oxide resin or its prepolymer provides the advantages including lower lamination temperature, high solvent solubility, high thermal resistance, appropriate viscosity, high melt flowability, high processability and formability and so on, as described below, making it highly suitable for the preparation of articles such as prepregs, resin films, laminates, printed circuit boards, etc.

BRIEF DESCRIPTION OF THE DRAWINGS

A more complete understanding of the subject matter can be derived by referring to the detailed description and claims when considered in conjunction with the following figures.

DETAILED DESCRIPTION OF THE INVENTION

Since various aspects and embodiments are merely exemplary and not limiting, after reading this specification, skilled artisans appreciate that other aspects and embodiments are possible without departing from the scope of the invention. Other features and benefits of any one or more of the embodiments will be apparent from the following detailed description and the claims.

Polyphenylene Oxide Resin

In the present disclosure, in order to improve the conventional polyphenylene oxide resins and improve the poor thermal resistance and solvent solubility of the conventional polyphenylene oxide resins, the inventors propose a polymerized and/or modified thermosetting polyphenylene oxide resin, having a structure represented by formula (I):

wherein b is a positive integer (e.g. a positive integer of 1 to 20 or 1 to 5), X is selected from any one of formula (II) to formula (IV) and a combination thereof:

Y has a structure represented by formula (V):

In formula (V), m and n independently represent a positive integer of 1 to 30, and m and n may be the same or different. Preferably, m and n are independently a positive integer of 1 to 10, such as a positive integer of 1 to 6.

In formula (V), $R_1$ to $R_{16}$ are independently selected from H, —$CH_3$ and halogen atoms; A is selected from a covalent bond, —$CH_2$—, —$CH(CH_3)$—, —$C(CH_3)_2$—, —O—, —S—, —$SO_2$— and carbonyl group.

Preferably, in formula (V), among $R_1$ to $R_{16}$, $R_2$, $R_3$, $R_7$, $R_8$, $R_{10}$, $R_{11}$, $R_{15}$ and $R_{16}$ are each —$CH_3$, the rest being H.

Preferably, in formula (V), among $R_1$ to $R_{16}$, $R_1$, $R_2$, $R_3$, $R_6$, $R_7$, $R_8$, $R_{10}$, $R_{11}$, $R_{15}$ and $R_{16}$ are each —$CH_3$, the rest being H.

For example, Y may have the following structure:

wherein m and n in formula (IX) and (X) are as defined above;

and Z has a structure of formula (VI), (VII) or (VIII) and a combination thereof:

wherein $R_{17}$ to $R_{23}$ are independently selected from H, —$CH_3$ and halogen atoms, Q and W are independently an aliphatic group, such as a $C_1$ to $C_3$ aliphatic group, and W is preferably —$CH_2$—.

In one embodiment, Q is —$CH_2$— and $R_{21}$ to $R_{23}$ are each H, such that formula (VII) is an allyl group. Preferably, $R_{17}$ to $R_{23}$ in formula (VI) are each H°

In addition, in one embodiment, Z may have the structure below:

The polymerized and/or modified thermosetting polyphenylene oxide resin obtained by this invention, compared with conventional vinylbenzyl-terminated PPOs, provides the following advantages: (1) it has only one delta H exothermic peak, which means only one reaction barrier exists during the lamination process, and the value of the single peak is between the two peak values of conventional vinylbenzyl-terminated PPOs, which means a lower lamination temperature can be used, thereby allowing reduction in lamination time or maximum lamination temperature during the lamination process; (2) it has desirable viscosity or higher number average molecular weight (viscosity ranging from 0.06 to 0.1 dL/g; or molecular weight (Mw) ranging from 2,000 to 10,000) and higher solubility in solvents; (3) it has better melt flowability; and (4) it has higher processability and formability.

Method of Preparing Polyphenylene Oxide Resin

The polyphenylene oxide resin of the present disclosure may be obtained by reacting a bis(chloromethyl) compound with dihydroxyl-terminated polyphenylene oxide, followed by the addition of a vinyl compound to complete the reaction and obtain the polyphenylene oxide resin. Preferably, the reaction is carried out in an alkaline environment and/or with the presence of a phase transfer catalyst.

In one embodiment, a bis(chloromethyl) compound, a dihydroxyl-terminated polyphenylene oxide, a phase transfer catalyst and a solvent are placed in a stirred tank and mixed at 60 to 90° C. until fully dissolved. Next, the temperature is increased to 85 to 110° C., and alkali metal hydroxide and water are added, followed by stirring for 4 to 8 hours. After that, the solution is cooled to 60 to 80° C., and a vinyl compound, such as a vinyl chloride compound, is added thereto, followed by stirring for 2 to 6 hours. Then the solution is cooled to room temperature, with the addition of a proper amount of acid and water to neutralize the reaction. The solution then is stirred with water addition, with waste liquid removed, and then subjected to reduced pressure distillation to remove solvent, so as to obtain the polymerized and/or modified thermosetting polyphenylene oxide resin.

Preferably, the bis(chloromethyl) compound is selected from bis(chloromethyl)benzene, bis(chloromethyl)biphenyl, bis(chloromethyl)ether and a combination thereof.

Preferably, the vinyl compound is selected from 4-chloromethyl styrene, 3-chloromethyl styrene, 2-chloromethyl styrene, methacrylic acid, chloropropene and a combination thereof.

More preferably, the vinyl compound is 4-chloromethyl styrene, 3-chloromethyl styrene or 2-chloromethyl styrene.

Preferably, the alkali metal hydroxide is sodium hydroxide or potassium hydroxide.

Preferably, the phase transfer catalyst is quaternary ammonium salt or tetrabutyl-phosphonium bromide.

More preferably, the phase transfer catalyst is tetra-n-butylammonium bromide.

Preferably, the acid is phosphoric acid, hydrochloric acid, sulfuric acid or acetic acid.

More preferably, the acid is phosphoric acid.

Preferably, the solvent is dimethyl sulfoxide, dimethyl formamide, dimethyl acetamide, toluene, xylene or a combination thereof.

More preferably, the solvent is toluene.

In one embodiment, the polyphenylene oxide resin may be prepared as described below. In air or inert gas, on molar basis, to 6 to 25 moles of solvent is added 1 mole of dihydroxyl-terminated polyphenylene oxide, less than or equal to 1 mole of bis(chloromethyl) compound and 0.5 to 1 mole of tetrabutylphosphonium bromide, which are then placed in a stirred tank and mixed at 60 to 90° C. until fully dissolved. Next, the temperature is increased to 85 to 110° C., and 3 to 7 moles of alkali metal hydroxide and a proper amount of water are added, followed by stirring for 4 to 8 hours. After that, the solution is cooled to 60 to 80° C., and 2 to 4 moles of vinyl compound is added thereto, followed by stirring for 2 to 6 hours. Then the solution is cooled to room temperature, with the addition of a proper amount of acid and distilled water to neutralize the reaction. The solution is then stirred with water addition, with waste liquid removed, and then subjected to reduced pressure distillation to remove solvent, so as to obtain the polymerized and/or modified thermosetting polyphenylene oxide resin.

Preferably, the bis(chloromethyl) compound is selected from bis(chloromethyl)benzene, bis(chloromethyl)biphenyl, bis(chloromethyl)ether and a combination thereof.

Preferably, the vinyl compound is selected from 4-chloromethyl styrene, 3-chloromethyl styrene, 2-chloromethyl styrene, methacrylic acid, chloropropene and a combination thereof.

More preferably, the vinyl compound is 4-chloromethyl styrene, 3-chloromethyl styrene or 2-chloromethyl styrene.

Preferably, the alkali metal hydroxide is sodium hydroxide or potassium hydroxide.

Preferably, the acid is phosphoric acid, hydrochloric acid, sulfuric acid or acetic acid.

More preferably, the acid is phosphoric acid.

Preferably, the solvent is dimethyl sulfoxide, dimethyl formamide, dimethyl acetamide, toluene, xylene or a combination thereof.

More preferably, the solvent is toluene.

The bis(chloromethyl) compound is not particularly limited and may be for example bis(chloromethyl)benzene, bis(chloromethyl)biphenyl, bis(chloromethyl)ether or a combination thereof. Generally, one or more specific bis(chloromethyl) compounds may be chosen according to the structure of the polyphenylene oxide resin to be obtained or synthesized.

The dihydroxyl-terminated polyphenylene oxide may be any hydroxyl-terminated polyphenylene oxide compound, such as the one with a structure represented by formula (XII), wherein m, n, $R_1$ to $R_{16}$, and A are defined as above.

(XII)

In one embodiment, SA-90 available from SABIC and/or OPE available from Mitsubishi Gas Chemical Co., Inc. may be useful as the dihydroxyl-terminated polyphenylene oxide.

The vinyl compound may be a vinyl chloride compound which may be any chloro-substituted compound containing a vinyl group, such as any aromatic or aliphatic compounds with a chloro group, such as 4-chloromethyl styrene, 3-chloromethyl styrene, 2-chloromethyl styrene and a combination thereof. The vinyl compound may also be methacrylic acid or chloropropene.

After reacting the bis(chloromethyl) compound, the dihydroxyl-terminated polyphenylene oxide, and the vinyl compound as the starting reactants according to the sequence and conditions mentioned above, the resultant polymerized and/or modified thermosetting polyphenylene oxide resin can be obtained. For example, the structure of one reaction product is shown as formula (XIII) or (XIV) below, wherein m and n are as defined above, but the polyphenylene oxide resin of this invention is not limited thereto.

(XIII)

(XIV)

In this invention, the bis(chloromethyl) compound and the dihydroxyl-terminated polyphenylene oxide are reacted first, followed by the addition of the vinyl compound, so as to obtain the polymerized and/or modified thermosetting polyphenylene oxide resin, which is more advantageous over conventional hydroxyl-terminated PPOs in the following aspects: (1) better dielectric properties than other hydroxyl-terminated PPOs due to the presence of vinyl groups; (2) desirable solubility; and (3) excellent thermal resistance.

Polyphenylene Oxide Resin Prepolymer

To further enhance one or more properties of the polyphenylene oxide resin, the polyphenylene oxide resin may be further reacted or pre-polymerized with a double-bond-containing compound, a double-bond-containing resin, or a mixture of a double-bond-containing compound and a double-bond-containing resin. For example, the polymerized and/or modified thermosetting polyphenylene oxide resin may be reacted or pre-polymerized with any one of the following substances or a mixture thereof: isocyanate, isocyanurate, maleimide, polyolefin, divinylbenzene or acrylic resin.

In one embodiment, the polyphenylene oxide resin is reacted and pre-polymerized with triallyl isocyanurate to obtain the polyphenylene oxide prepolymer.

In one embodiment, the polyphenylene oxide resin is reacted and pre-polymerized with styrene-butadiene polymer to obtain the polyphenylene oxide prepolymer.

The polyphenylene oxide prepolymer may be prepared according to the process described below: adding the polymerized and/or modified thermosetting polyphenylene oxide resin and a double-bond-containing compound, a double-bond-containing resin, or a mixture of a double-bond-containing compound and a double-bond-containing resin to a solvent (e.g. toluene), heating and stirring until they are fully dissolved, then adding peroxide to induce crosslinking therebetween, and performing purification to obtain the end product polyphenylene oxide prepolymer.

Resin Compositions and Articles Made Therefrom

Both the polyphenylene oxide resin and polyphenylene oxide prepolymer according to the present invention may be useful for preparing resin compositions.

This invention provides a resin composition, comprising: (A) the aforesaid polyphenylene oxide resin, its prepolymer or a mixture thereof; and (B) a property modifier for modifying at least one property of the resin composition comprising flame retardancy, thermal resistance, dielectric constant, dissipation factor, toughness, reactivity, viscosity and solubility.

In one embodiment, the (B) property modifier is selected from flame retardant, inorganic filler, olefin polymer, surfactant, toughener, curing accelerator (e.g. peroxide), solvent and a combination thereof.

In one preferred embodiment, the resin composition comprises: (A) the aforesaid polyphenylene oxide resin, its prepolymer or a mixture thereof; (B) flame retardant; and (C) peroxide.

In one preferred embodiment, the resin composition comprises: (A) 100 parts by weight of the polyphenylene oxide resin, its prepolymer or a mixture thereof; (B) 10 to 90 parts by weight of flame retardant; and (C) 0.01 to 5 parts by weight of peroxide.

The purpose of curing accelerator is to increase the reaction rate of the resin composition.

The curing accelerator may comprise catalysts, such as a Lewis base or a Lewis acid, wherein the Lewis base may comprise any one or more of imidazole, boron trifluoride-amine complex, ethyltriphenyl phosphonium chloride, 2-methylimidazole (2M1), 2-phenyl-1H-imidazole (2PZ), 2-ethyl-4-methylimidazole (2E4MI), triphenylphosphine (TPP) and 4-dimethylaminopyridine (DMAP), and the Lewis acid may comprise metal salt compounds, such as those of manganese, iron, cobalt, nickel, copper and zinc, such as zinc octanoate or cobalt octanoate as metal catalyst.

Preferably, the curing accelerator is a peroxide capable of producing free radicals, including but not limited to dicumyl peroxide, tert-butyl peroxybenzoate, and di(tert-butylperoxyisopropyl) benzene, wherein di(tert-butylperoxyisopropyl)benzene is more preferred.

The flame retardant is a compound with flame retardant element(s) or flame retardant functional group(s), such as a phosphorous-containing compound, a nitrogen-containing compound or a bromine-containing compound. If the resin composition contains a flame retardant, the content thereof may be 10 to 200 parts by weight relative to 100 parts by weight of the resin composition, but not limited thereto.

The phosphorous-containing compound may be at least one of the following compounds, but not limited thereto: bisphenol diphenyl phosphate, ammonium polyphosphate, hydroquinone bis-(diphenyl phosphate), bisphenol A bis-(diphenylphosphate), tri(2-carboxyethyl)phosphine (TCEP), tri(chloroisopropyl) phosphate, trimethyl phosphate (TMP), dimethyl methyl phosphonate (DMMP), resorcinol bis(dixylenyl phosphate) (RDXP, such as PX-200, commercially available from Daihachi Chemical Industry Co. Ltd.), phosphazene (such as SPB-100, commercially available from Otsuka Chemical Co. Ltd.), m-phenylene methylphosphonate (PMP), melamine polyphosphate, 9,10-dihydro-9-oxa-10-phosphaphenanthrene-10-oxide (DOPO), DOPO-containing phenolic resin (e.g. DOPO-HQ, DOPO-PN, and DOPO-BPN), DOPO-containing epoxy resin, DOPO-HQ-containing epoxy resin, and so on, wherein DOPO-BPN may be bisphenol novolac compounds such as DOPO-BPAN, DOPO-BPFN, and DOPO-BPSN, diphenyl phosphine oxide (DPPO) compound, diphenylphosphine oxide derivatives, etc.

The nitrogen-containing compound may be at least one of the following compounds, but not limited thereto: amino triazine novolac (ATN), melamine cyanurate, and trihydroxy ethyl isocyanurate.

The bromine-containing compound may be at least one of the following compounds, but not limited thereto: tetrabromobisphenol A (TBBPA), tetrabromocyclohexane, hexabromocyclodecane and 2,4,6-tris(tribromophenoxy)-1,3,5-triazine and decabromodiphenyl ethane.

The inorganic filler comprises at least one of silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin Preferably, the inorganic filler may be spherical, fibrous, plate-like, particulate, sheet-like or whisker-like and can be optionally pretreated by a silane coupling agent, such as silane or siloxane compound.

Preferably, the inorganic filler contains granular powder under 100 µm in size, preferably 1 to 20 µm in size, and most preferably nano-granular powder under 1 µm in size.

If the resin composition contains the inorganic filler, the content thereof may be 10 to 200 parts by weight relative to 100 parts by weight of the resin composition, but not limited thereto.

The resin composition may be further added with olefin polymer (polyolefin), such as one or more selected from styrene-butadiene-divinylbenzene terpolymer, styrene-butadiene-maleic anhydride terpolymer (styrene-butadiene copolymer adducted with maleic anhydride), vinyl-polybutadiene-urethane oligomer, styrene butadiene copolymer, hydrogenated styrene butadiene copolymer, styrene isoprene copolymer, hydrogenated styrene isoprene copolymer and a combination thereof.

The resin composition is preferably added with styrene-butadiene-divinylbenzene terpolymer, styrene-butadiene-maleic anhydride terpolymer, vinyl-polybutadiene-urethane oligomer or a combination thereof.

With the addition of olefin polymer, the dielectric properties of the resin composition can be improved. If the resin composition contains olefin polymer, the content thereof may be 5 to 100 parts by weight relative to 100 parts by weight of the polyphenylene oxide resin, but not limited thereto.

The resin composition may optionally comprise at least one compound selected from the following group, its modification or a combination thereof: isocyanate, isocyanurate, and maleimide.

The isocyanate is selected from at least one of the following group or a combination thereof, but not limited thereto: 1,4-cyclohexane diisocyanate, isophorone diisocyanate, methylene bis(4-cyclohexylisocyanate), hydrogenated 1,3-xylylene diisocyanate and hydrogenated 1,4-xylylene diisocyanate.

The isocyanurate is preferably triallyl isocyanurate.

If the resin composition contains isocyanate and/or triallyl isocyanurate, the content thereof may be 10 to 100 parts by weight relative to 100 parts by weight of the polyphenylene oxide resin, but not limited thereto.

The maleimide resin is selected from at least one of the following group or a combination thereof, but not limited thereto: 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide and 1,6-bismaleimide-2,2,4-trimethyl hexane. If the resin composition contains maleimide resin, the content thereof may be 10 to 100 parts by weight relative to 100 parts by weight of the polyphenylene oxide resin, but not limited thereto.

The resin composition of this invention may also be used in conjunction with the following PPOs: dihydroxyl-terminated polyphenylene oxide (e.g. SA-90 available from SABIC), bis(vinylbenzyl)ether polyphenylene oxide resin (e.g. OPE-2st available from Mitsubishi Gas Chemical Co., Inc.), vinyl-benzylated modified bisphenol A polyphenylene oxide, and methacrylic polyphenylene oxide resin (e.g. SA-9000 available from SABIC).

The purpose of surfactant is to ensure uniform distribution of the inorganic fillers in the resin composition. The surfactant may comprise silane and siloxane compounds.

The purpose of toughener is to improve the toughness of the resin composition, wherein the toughener may comprise rubber resin, carboxyl-terminated butadiene acrylonitrile rubber (CTBN), core-shell rubber and other additives.

The purpose of solvent is to alter the solid content of the resin composition and adjust the viscosity of the resin composition, wherein the solvent may comprise methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, propylene glycol methyl ether, or a mixture thereof.

The aforesaid polyphenylene oxide resin, its prepolymer and resin composition are suitable for manufacturing various articles, particularly prepregs, resin films, laminates, and printed circuit boards.

A prepreg thus made has at least one property of high impact strength, low thermal expansion, high thermal resistance, high dimensional stability, better dielectric properties, high flame retardancy, and low void content. The prepreg may comprise a reinforcement material and the aforementioned resin composition, wherein the reinforcement material is impregnated with the resin composition and becomes semi-cured under high temperature heating. The reinforcement material may be fibrous material, woven fabric and non-woven fabric, such as fiberglass cloth, which can increase the mechanical strength of the prepreg. In addition, the reinforcement material can be optionally pre-treated by silane coupling agent or siloxane coupling agent, such as fiberglass cloth pretreated by silane coupling agent. The prepreg can be cured to form a cured sheet or cured insulation layer under high temperature heating or under high temperature and high pressure conditions. If the resin composition contains solvent, the solvent will be evaporated and removed during high temperature heating.

A resin film thus made has at least one property of high impact strength, low thermal expansion, high thermal resistance, high dimensional stability, better dielectric properties, high flame retardancy, and low void content. The resin film contains the aforesaid resin composition. The resin composition may be coated on a polyester (PET) film, a polyimide (PI) film or a copper foil (resin coated copper, RCC), followed by baking and heating to the semi-cured state to obtain the resin film.

A laminate thus made has at least one property of high impact strength, low thermal expansion, high thermal resistance, high dimensional stability, better dielectric properties, high flame retardancy, and low void content, and is particularly useful for a circuit board with high speed and high frequency signal transmission. The laminate comprises two or more copper foils and at least one insulation layer, wherein the copper foils may further comprise an alloy of copper and at least one of aluminum, nickel, platinum, silver and gold. The insulation layer is made by curing the prepreg or resin film at high temperature and high pressure, such as by placing the prepreg between two copper foils and performing lamination at high temperature and high pressure. The laminate may be further processed by trace formation processes to provide a circuit board, which can be connected with electronic components and operated under severe conditions such as high temperature and high moisture without deteriorating its quality.

A printed circuit board thus made has at least one property of high impact strength, low thermal expansion, high thermal resistance, high dimensional stability, better dielectric properties, high flame retardancy, and low void content, and is suitable for high speed and high frequency signal transmission. The circuit board comprises at least one such laminate and may be made according to conventional processes.

To further disclose the present invention to enable those skilled in the art to make and use the present invention, several examples are cited below to elaborate this invention. However, it should be noted that these examples are meant to further describe the invention and not to limit the scope of this invention, and all modifications and variations made by the skilled artisan without departing from the concept of this invention shall remain within the scope as claimed.

EMBODIMENT

Preparation Example

Preparation of Polymerized and/or Modified Thermosetting Polyphenylene Oxide Resin (I)

Add 400 g (0.2 mol) of SA-90 (available from SABIC), 17.5 g (0.1 mol) of α,α'-dichloro-p-xylene, 33.9 g (0.01 mol) of tetrabutylphosphonium bromide and 600 g of toluene into a stirred tank, heat to 75° C. and stir until fully dissolved and well mixed. After heating to 95° C., add 45 g (1.125 mol) of NaOH and 33 g of deionized water, followed by stirring for 6 hours. Cool to 70° C. and then add 53.4 g (0.35 mol) of 4-chiro-methyl styrene (CMS-P), followed by stirring for 4 hours. After reaction for 4 hours, cool to room temperature and carry out neutralization, with the addition of 8.8 g (0.09 mol) of phosphoric acid and 165 g of deionized water, and then stand still to allow layer separation. Add 330 g of deionized water and stir, and remove waste liquid in three stages. Finally perform reduced pressure distillation to remove solvent, thereby obtaining the polymerized and/or modified polyphenylene oxide resin (component A).

Figure 1:
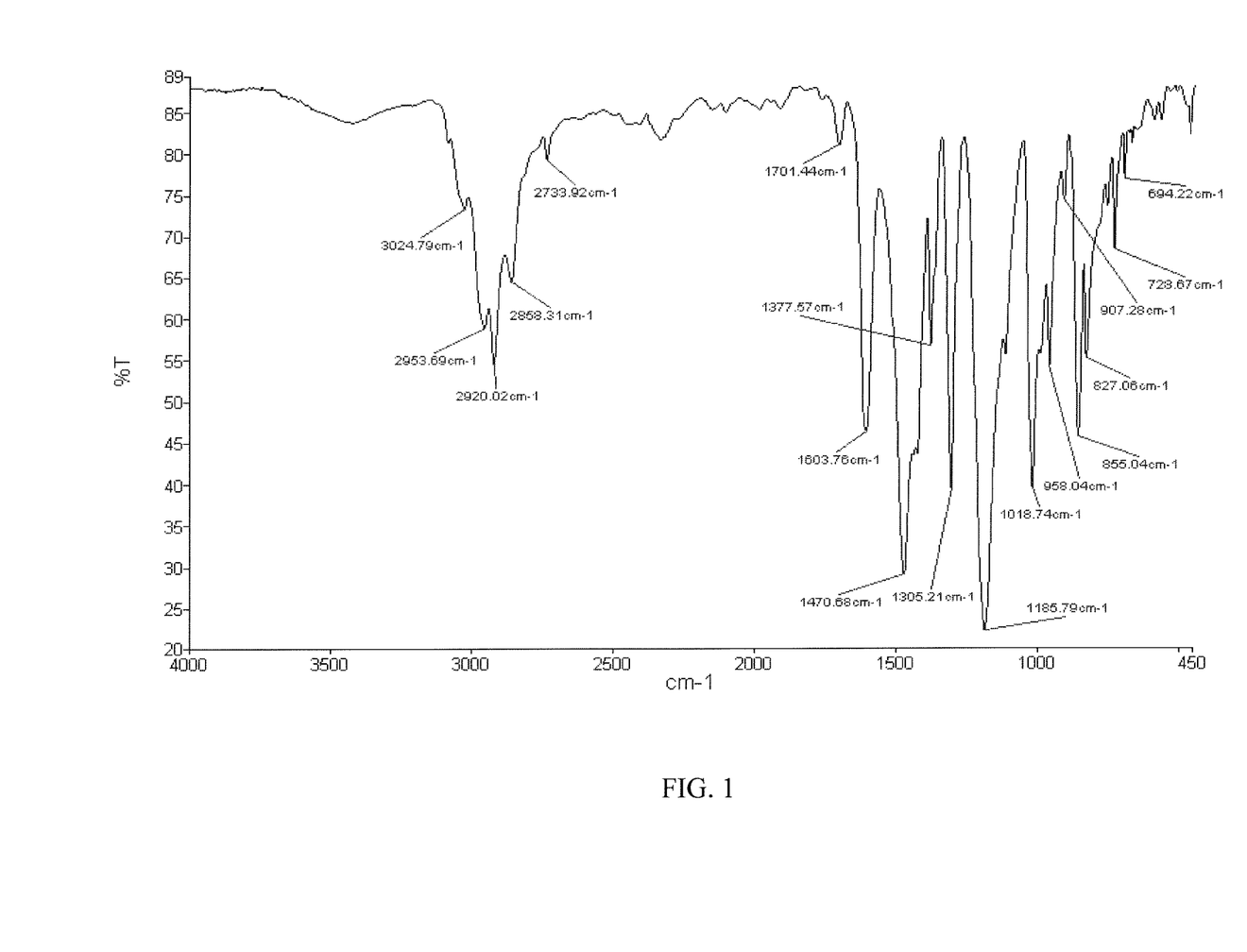
FIG. 1 is the FTIR spectra of the PPO resin according to the present invention.
Figure 2:
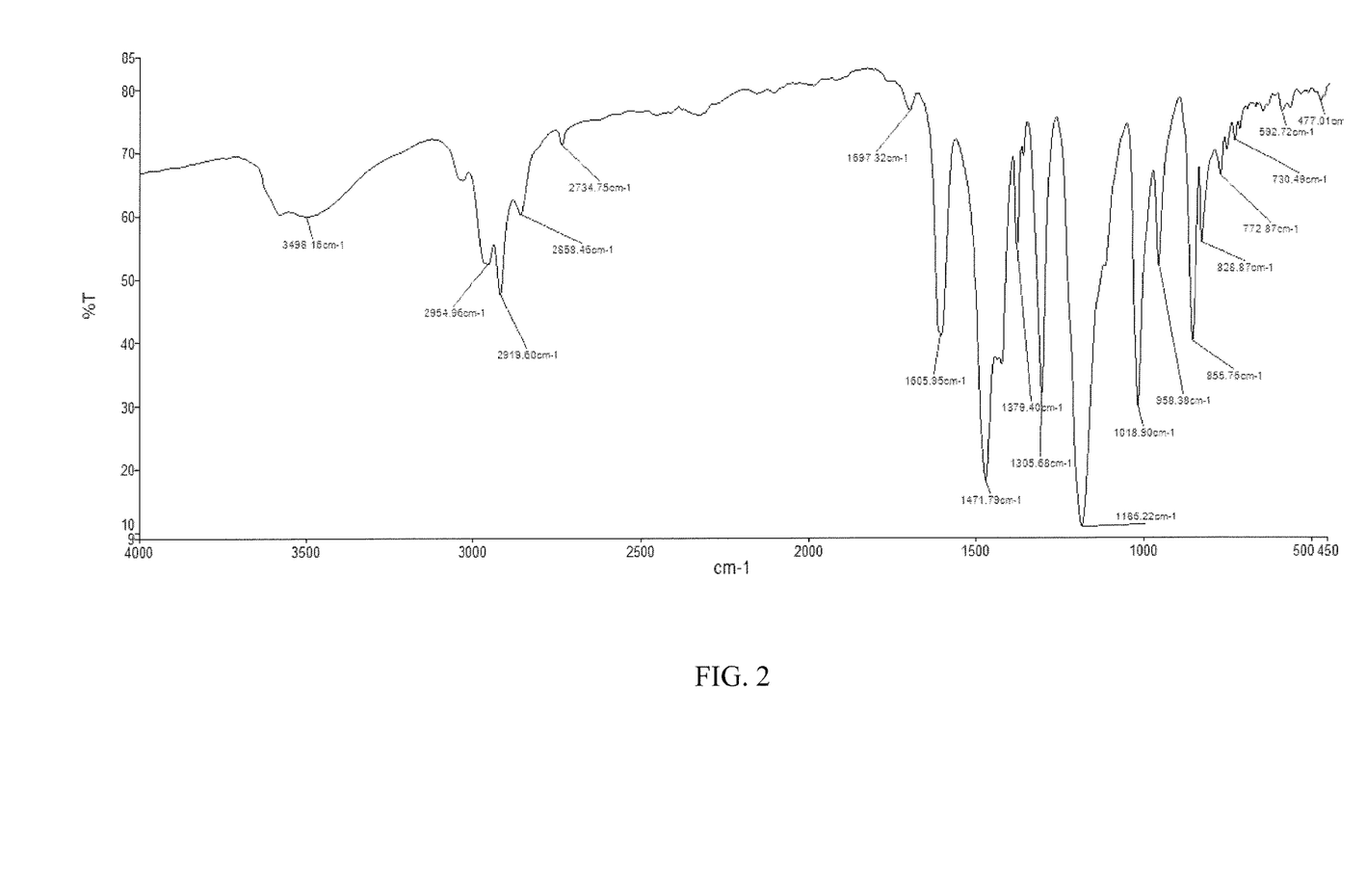
FIG. 2 is the FTIR spectra of a conventional dihydroxyl-terminated PPO (SA-90)

Use FTIR analysis to characterize the product thus obtained, and the results are shown in the figures. FIG. 1 is the FTIR spectra of the product thus prepared (component A), wherein a peak (907 $cm^{-1}$) is observed between 900 $cm^{-1}$ to 910 $cm^{-1}$ representing the presence of vinyl group. FIG. 2 is the FTIR spectra of dihydroxyl-terminated polyphenylene oxide (SA-90), in which the peak representing the presence of vinyl group is not shown between 900 $cm^{-1}$ to 910 $cm^{-1}$. The comparison of FIG. 1 and FIG. 2 indicates that the aforesaid synthesis process has successfully obtained p-xylylene vinylbenzyl polyphenylene oxide resin.

Figure 3:
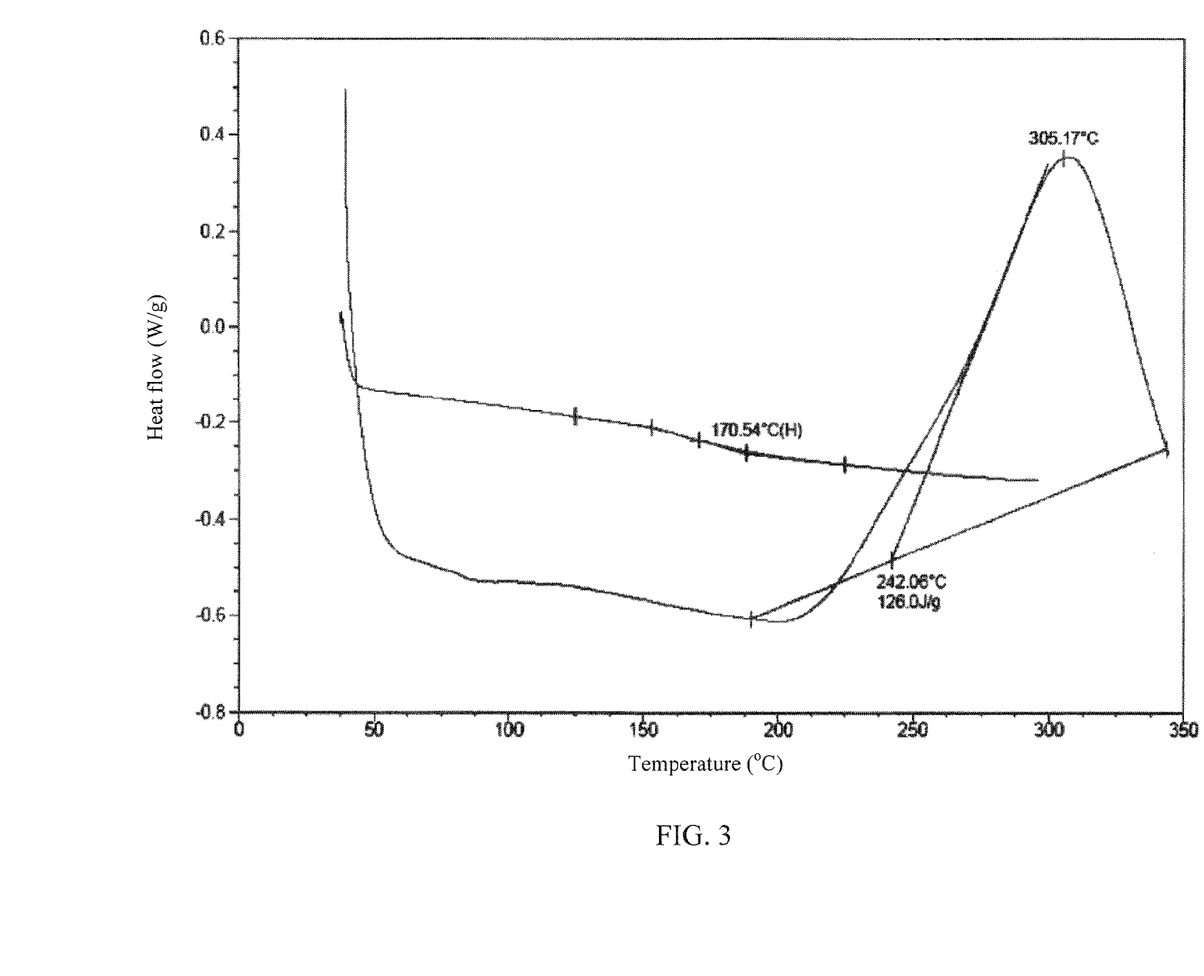
FIG. 3 is the DSC plot of the PPO resin according to the present invention.
Figure 4:
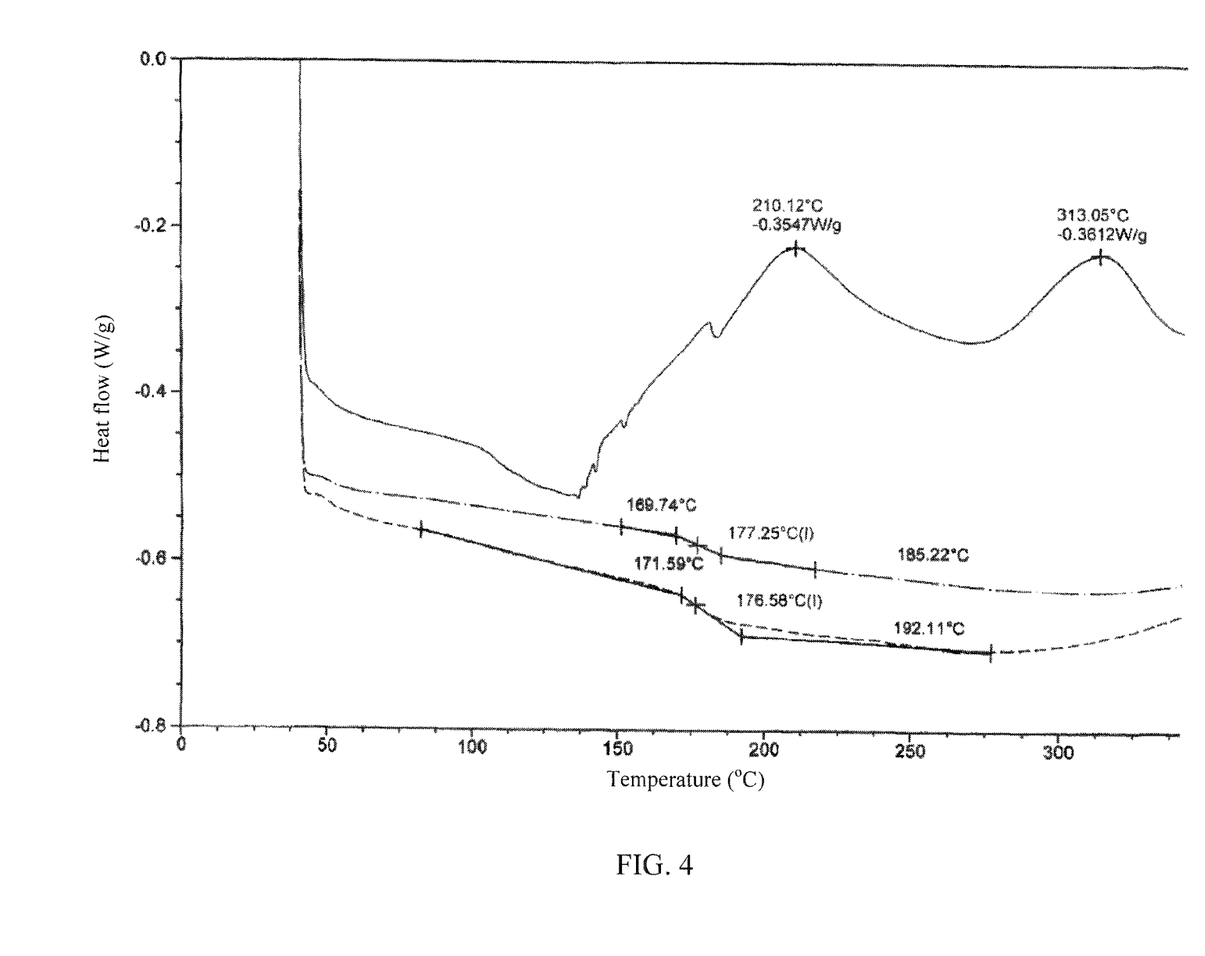
FIG. 4 is the DSC plot of a conventional bis(vinylbenzyl)-terminated PPO (OPE-2st).

Component A thus obtained is further analyzed by DSC for its Tg and ΔH. FIG. 3 is the DSC plot of component A, which has a Tg of 170.44° C., and FIG. 4 is the DSC plot of bis(vinylbenzyl)-terminated PPO (OPE-2st), which has a Tg of 177.25° C. There is no significant difference in Tg, but component A has only one exothermic peak and OPE-2st has two exothermic peaks.

Preparation Example

Preparation of Polymerized and/or Modified Thermosetting Polyphenylene Oxide Resin (II)

To a four-neck flask equipped with a mechanical stirring rod and a condensation and reflux device, sequentially add 1000 g of SA-90, 55 g of 1,4-p-xylylene dichloride, 50 g of tetra-n-butylammonium bromide, 1100 g of toluene and 200 g of 20% sodium hydroxide solution, followed by stirring at 80° C. until a homogeneous solution is formed, followed by reaction for 5 hours to obtain the intermediate; heat to 90° C. and then add 50 g of NaOH and 100 g of deionized water and keep stirring for 6 hours. Then add dropwise the mixture solution of 100 g of p-vinylbenzyl chloride and 50 g of toluene, followed by holding the temperature for 6 hours. Cool to room temperature after the reaction is completed and add diluted phosphoric acid solution to adjust the pH to about 7. Stand still to allow layer separation and wash with water for several times to remove salts formed, followed by reduced pressure distillation to remove solvent, thereby obtaining the thermosetting polyphenylene oxide resin product.

Dissolve 100 g of each PPO listed in Table 1 in 50 g of toluene solvent and add 2 g of 25B peroxide and mix to form a varnish. Impregnate 2116 fiberglass clothes with the varnishes thus prepared and perform DSC and GPC analysis as well as visual inspection, from which the following properties can be obtained.

TABLE 1

Comparison of Three PPOs

| Property | PPO type | | |
|---|---|---|---|
| | Component A | SA-90 | OPE-2st (2200) |
| Tg (DSC, ° C.) | 170 | 135 | 175 to 177 |
| Intrinsic viscosity (I.V., dL/g) | 0.095 | 0.083 | 0.065 |
| Molecular weight (Mw) | 2700 | 1800 | 2200 |
| Prepreg appearance | smooth | not smooth | smooth |
| Prepreg processability | non-tacky | tacky and scummy | tacky and scummy |
| Solubility in butanone | completely dissolved | not completely dissolved | not completely dissolved |
| Solubility in toluene | completely dissolved | completely dissolved | completely dissolved |

From Table 1, it can be observed that the polyphenylene oxide resin according to the present disclosure, compared with conventional dihydroxyl-terminated or bis(vinylbenzyl)-terminated PPOs, provides prepregs with higher smoothness, better processability without sagging and stickiness, and high solubility in organic solvents (e.g. inhibited precipitation problem).

It should be noted that, in addition to, or other than, the raw materials used above for preparing the polyphenylene oxide resin, skilled artisans also appreciate that the polyphenylene oxide resin may be prepared by other suitable raw materials according to different needs. For example, OPE (available from Mitsubishi Gas Chemical Co., Inc.) may be substitute for SA-90 as the dihydroxyl-terminated polyphenylene oxide; 2,5-dichlorobenzoic acid may be substitute for α,α'-dichloro-p-xylene as the bis(chloromethyl) compound; and chloropropene may be substitute for chloromethyl styrene as the vinyl chloride compound useful in the polymerization so as to obtain various polyphenylene oxide resins with the structure of formula (1).

Preparation Example

Preparation of Polyphenylene Oxide Prepolymer (I)

Add 50 g of component A and 50 g of TAIL, which serves as the crosslinking promotor, into a stirred tank containing 100 g of toluene, heat to 85° C. and stir until fully dissolved. Then add 0.5 g of dibenzyl peroxide (NYPER BW, available from NOF Corporation) to react for 8 hours so as to form the product p-xylylene vinylbenzyl polyphenylene oxide prepolymerized with isocyanate ester.

Preparation Example

Preparation of Polyphenylene Oxide Prepolymer (II)

Add 50 g of component A and 50 g of Ricon 181 (styrene-butadiene polymer, available from Cray Valley) into a stirred tank containing 100 g of toluene, heat to 85° C. and stir until fully dissolved. Then add 0.5 g of dibenzyl peroxide (NYPER BW, available from NOF Corporation) to react for 8 hours so as to form the product prepolymer (prepolymer B).

Preparation Example

Preparation of Resin Composition

Fully mix the ingredients listed in Tables 2 to 4 to obtain resin varnishes of the resin compositions respectively, wherein E represents the examples of the resin compositions and C represents the comparative examples according to the present invention. It should be noted that although the examples and comparative examples are distinguished by different symbols to highlight the efficacy of some ingredients or use amounts, this is only for the purpose of allowing convenient illustration and not intended to exclude the comparative examples from the scope of this invention.

The names of chemicals used in the examples and comparative examples are as follows:

DPPO derivative: P-xylylenebis(diphenyl phosphine oxide), available from Elite Material Co., Ltd.;

SA-90: dihydroxyl-teiminated polyphenylene oxide, available from SABIC;

SA-9000: methacrylate-terminated bisphenol A polyphenylene oxide resin, available from SABIC;

OPE-2st: bis(vinylbenzyl)-terminated polyphenylene oxide resin, available from Mitsubishi Gas Chemical Co., Inc.;

25B: 2,5-dimethyl-2,5-di(t-butylperoxy)hexyne-3, available from NOF Corporation;

SQ-5500 SVJ: spherical silica pre-treated by alkyl siloxane compound, available from Admatechs;

Ricon257: styrene-butadiene-divinylbenzene terpolymer, available from Cray Valley;

Ricon184MA6: styrene-butadiene-maleic anhydride terpolymer, available from Cray Valley;

Homide122: bismaleimide, available from HOS-Technik;

Melapur200 F: phosphorus-nitrogen flame retardant, available from BASF;

SAYTEX 8010: decabromodiphenyl ethane, available from Albemarle; 2MI: 2-methylimidazole, available from Sigma-Aldrich.

TABLE 2

Resin Composition Contents (in parts by weight)

| Ingredient | Constituent | Example | E1 | E2 | E3 | C1 | C2 |
|---|---|---|---|---|---|---|---|
| flame retardant | DPPO flame retardant | DPPO derivative | 45 | | 45 | 45 | 45 |
| polyphenylene oxide resin | hydroxyl PPO | SA-90 | | | | | 100 |
| | vinyl PPO | SA-9000 | | | 35 | 100 | |
| | polymerized/modified PPO | component A | 100 | 100 | 65 | | |
| | peroxide | 25B | 2 | 2 | 2 | 2 | 2 |
| imidazole | 2-methylimidazole | 2MI | | | | | 1 |
| inorganic filler | spherical silica | SQ-5500 SVJ | 80 | 80 | 80 | 80 | 80 |
| solvent | | toluene | 100 | 100 | 100 | 100 | 100 |
| | | MEK | 30 | 30 | 30 | 30 | 30 |

TABLE 3

Resin Composition Contents (in parts by weight)

| Ingredient | Constituent | Example | E4 | C3 | E5 | E6 | E7 | E8 | E9 | E10 | E11 | E12 | E13 |
|---|---|---|---|---|---|---|---|---|---|---|---|---|---|
| polyphenylene oxide resin | polymerized/modified PPO | component A | 100 | | 80 | 50 | 100 | 100 | 70 | 100 | 100 | 100 | |
| | vinyl PPO | SA-9000 | | 100 | 20 | 50 | | | 30 | | | | |
| | polyphenylene oxide prepolymer | prepolymer B | | | | | | | | | | | 100 |
| olefin polymer | styrene-butadiene-divinylbenzene | Ricon257 | 15 | 15 | 15 | 15 | 15 | 15 | 25 | 35 | 35 | 15 | |
| | styrene-butadiene-maleic anhydride | Ricon184MA6 | 15 | 15 | 15 | 15 | 15 | 15 | 7.5 | 7.5 | 7.5 | 15 | |
| | triallyl isocyanurate | TAIC | | | | | | | | | | 50 | |
| | bismaleimide | Homide 122 | 25 | 25 | 25 | 25 | 50 | 40 | 25 | | 25 | 25 | |
| flame retardant | DPPO flame retardant | DPPO derivative | 45 | 45 | 45 | 45 | 45 | 45 | 45 | 20 | 20 | 45 | 45 |
| | phosphorus-nitrogen flame retardant | Melapur200 F | | | | | | | | 20 | 20 | | |
| | decabromodiphenyl ethane | SAYTEX 8010 | | | | | | | 70 | 40 | 40 | | |
| | peroxide | 25B | 2 | 2 | 2 | 2 | 2 | 2 | 2 | 2 | 2 | 2 | 2 |
| inorganic filler | spherical silica | SQ-5500 SVJ | 80 | 80 | 80 | 80 | 80 | 80 | 80 | 80 | 80 | 80 | 80 |
| solvent | | toluene | 100 | 100 | 100 | 100 | 100 | 100 | 100 | 100 | 100 | 100 | 100 |
| | | MEK | 30 | 30 | 30 | 30 | 30 | 30 | 30 | 30 | 30 | 30 | 30 |

TABLE 4

Resin Composition Contents (in parts by weight)

| Ingredient | Constituent | Example | C4 | C5 | C6 | C7 | C8 | C9 | C10 | C11 | C12 | C13 |
|---|---|---|---|---|---|---|---|---|---|---|---|---|
| polyphenylene oxide resin | polymerized/modified PPO | component A | 20 | | 100 | 100 | 100 | 100 | 100 | | 70 | |
| | vinyl PPO | SA-9000 | 80 | 50 | | | | | | 100 | 30 | |
| | vinyl PPO | OPE-2st | | | | | | | | | | 100 |
| olefin polymer | styrene-butadiene-divinylbenzene | Ricon257 | 15 | 15 | 50 | 15 | 15 | 15 | 5 | 35 | 25 | 15 |
| | styrene-butadiene-maleic anhydride | Ricon184MA6 | 15 | 15 | 30 | 15 | 15 | 15 | 5 | 7.5 | 7.5 | 15 |
| | bismaleimide | Homide 122 | 25 | 25 | 25 | 25 | 25 | 25 | 25 | 25 | | 25 |
| flame retardant | DPPO flame retardant | DPPO derivative | 45 | 45 | 45 | 100 | 10 | | 45 | 20 | 45 | 45 |
| | phosphorus-nitrogen flame retardant | Melapur200 F | | | | | | | | 20 | | |
| | decabromodiphenyl ethane | SAYTEX 8010 | | | | | | | | 40 | 70 | |
| | peroxide | 25B | 2 | 2 | 2 | 2 | 2 | 2 | 2 | 2 | 2 | |
| inorganic filler | spherical silica | SQ-5500 SVJ | 80 | 80 | 80 | 80 | 80 | 80 | 80 | 80 | 80 | 80 |
| solvent | | toluene | 100 | 100 | 100 | 100 | 100 | 100 | 100 | 100 | 100 | 100 |
| | | MEK | 30 | 30 | 30 | 30 | 30 | 30 | 30 | 30 | 30 | 30 |

Preparation Example

Laminate Preparation and Analysis

Resin compositions of E1 to E13 and C1 to C13 listed in the tables above were well mixed in a stirred tank separately and then placed in an impregnation tank, and fiberglass clothes (2116 fiberglass clothes, available from Nan Ya Plastics Corp.) were individually passed through the impregnation tank to impregnate the fiberglass clothes with the resin compositions, followed by heating and baking to a semi-cured state to obtain prepregs.

From the prepregs prepared batchwise above, four prepregs from the same batch were covered by two 18 μm copper foils from the top and bottom and subjected to a lamination process under vacuum at 210° C. for 2 hours to form a copper-clad laminate, in which the four prepregs were cured to form the insulation layers between the two copper foils.

The copper-clad laminates obtained above and copper-free laminates obtained by etching were subjected to physical property tests, wherein the copper-free laminates containing four laminated prepregs have a resin content of about 55%. For dielectric constant and dissipation factor analysis, laminates with two prepregs without copper foil were tested; for other test items, laminates with four prepregs without copper foil were tested. Physical properties tested include: IZOD impact strength (according to ASTM D256 standard, wherein laminates with 8 prepregs were tested), thermal expansion (CTE z-axis, dimensional change measurement range: 50 to 260° C., measured by TMA, %; lower percentage is more preferred), thermal resistance (T288, measured by TMA, wherein the time for a copper-clad laminate at 288° C. without blistering or delamination is recorded), dielectric constant (Dk, measured by an AET's microwave dielectrometer; lower Dk represents a better dielectric property), dissipation factor (Df, measured by an AET's microwave dielectrometer; lower Df represents a better dielectric property), flame retardancy (flaming test, UL94, wherein V-0 is superior to V-1), and void content (measured by SEM). The results are respectively listed in Tables 5 to 7.

TABLE 5

Laminate Test Results

| Property | Items (method) | Unit | E1 | E2 | E3 | C1 | C2 | E13 |
|---|---|---|---|---|---|---|---|---|
| IZOD impact strength | ASTM D256 | (J/m) | 273 | 260 | 230 | 185 | 190 | 303 |
| thermal expansion | dimensional change percentage (TMA) | % | 3.02 | 3.15 | 3.08 | 3.15 | 4.5 | 3.11 |
| 288° C. thermal resistance | T288 (TMA) | minute | >60 | >60 | >60 | >60 | 3 | >60 |
| dielectric constant | Dk@10 GHz | NA | 3.61 | 3.58 | 3.75 | 3.89 | 3.98 | 3.51 |
| dissipation factor | Df@10 GHz | NA | 0.0060 | 0.0059 | 0.0062 | 0.0069 | 0.0100 | 0.0052 |
| flame retardancy | UL94 | grade | V-0 | burn out | V-0 | V-0 | V-0 | V-0 |
| void content | visual inspection (SEM) | number | <3 | <3 | <3 | >10 | >10 | <3 |

TABLE 6

Laminate Test Results

| Property | Items (method) | Unit | E4 | C3 | E5 | E6 | E7 | E8 | E9 | E10 | E11 | E12 |
|---|---|---|---|---|---|---|---|---|---|---|---|---|
| IZOD impact strength | ASTM D256 | (J/m) | 253 | 201 | 242 | 227 | 213 | 217 | 235 | 230 | 230 | 224 |
| thermal expansion | dimensional change percentage (TMA) | % | 3.06 | 3.05 | 2.78 | 2.73 | 2.47 | 2.55 | 2.82 | 3.21 | 3.08 | 2.73 |
| 288° C. thermal resistance | T288 (TMA) | minute | >60 | >60 | >60 | >60 | >60 | >60 | >60 | 27 | >60 | >60 |
| dielectric constant | Dk@10 GHz | NA | 3.48 | 3.89 | 3.71 | 3.78 | 3.59 | 3.53 | 3.73 | 3.59 | 3.59 | 3.65 |
| dissipation factor | Df@10 GHz | NA | 0.0052 | 0.0068 | 0.0057 | 0.0065 | 0.0053 | 0.0053 | 0.0058 | 0.0057 | 0.0057 | 0.0056 |
| flame retardancy | UL94 | grade | V-0 | V-0 | V-0 | V-0 | V-0 | V-0 | V-0 | V-0 | V-0 | V-0 |

TABLE 7

Laminate Test Results

| Property | Items (method) | Unit | C4 | C5 | C6 | C7 | C8 | C9 | C10 | C11 | C12 | C13 |
|---|---|---|---|---|---|---|---|---|---|---|---|---|
| IZOD impact strength | ASTM D256 | (J/m) | 209 | 198 | 297 | 220 | 286 | 293 | 257 | 208 | 231 | 205 |

TABLE 7-continued

Laminate Test Results

| Property | Items (method) | Unit | C4 | C5 | C6 | C7 | C8 | C9 | C10 | C11 | C12 | C13 |
|---|---|---|---|---|---|---|---|---|---|---|---|---|
| thermal expansion | dimensional change percentage (TMA) | % | 3.01 | 3.38 | 3.16 | 3.01 | 3.08 | 3.48 | 2.65 | 3.55 | 2.97 | 3.01 |
| 288° C. thermal resistance | T288 (TMA) | minute | >60 | >60 | 23 | 20 | 20 | >60 | >60 | >60 | 32 | >60 |
| dielectric constant | Dk@10 GHz | NA | 3.79 | 3.95 | 3.46 | 3.85 | 3.85 | 3.44 | 3.68 | 3.82 | 3.72 | 3.52 |
| dissipation factor | Df@10 GHz | NA | 0.0069 | 0.0076 | 0.0050 | 0.0085 | 0.0058 | 0.0053 | 0.0057 | 0.0076 | 0.0061 | 0.0058 |
| flame retardancy | UL94 | grade | V-0 | V-0 | V-0 | V-0 | V-1 | burn out | V-0 | V-0 | V-0 | V-0 |

Result Analysis

From E1 to E3 and C1 to C2, it is observed that laminates made from resin compositions containing polymerized and/or modified PPO (component A) have apparently higher impact strength and thermal expansion and thermal resistance superior to those made from resin compositions containing dihydroxyl-terminated PPO. In addition, resin compositions with component A have dielectric properties (dielectric constant and dissipation factor) and void content (filling property) superior to those using conventional PPOs. In addition, from the results of SA-90 and component A, it can be inferred that after polymerization and modification of a dihydroxyl-terminated PPO, a polymerized and/or modified PPO with better properties can be obtained.

From E4 and E1, it is observed that the addition of olefin polymer and bismaleimide may further lower dielectric constant and dissipation factor; the comparison of E4 and C3 shows that laminates made from resin compositions containing component A have better impact strength and excellent dielectric properties. In addition, E5 and E6 indicate that overall better laminate properties, such as impact strength, dimensional change, and thermal resistance, can be obtained when the polymerized and/or modified PPO is used with other PPOs.

From the comparison of E7 to E8 and E4, the influence of use amount of bismaleimide on the laminate properties can be observed, such as a higher amount results in lower thermal expansion. From E9 to E12, the influences of different factors and parameters on the laminate properties can be observed, such as the type and amount of the vinyl compound, the presence of TAIL, the absence of bismaleimide, and the type and amount of flame retardant, indicating that the polymerized and/or modified PPO can be used in conjunction with different ingredients in different amounts to adjust different properties of the laminate to meet the actual demand in use.

In addition, from the comparison of C4 to C12, the following observations can be made. Compared with conventional PPOs (C5 and C11), the use of polymerized and/or modified PPO can obtain overall better laminate properties; when the amount of olefin polymer is increased (C6), the impact strength of the laminate can be increased, but the thermal resistance may be decreased, whereas when the amount of olefin polymer is decreased (C10), a certain degree of impact strength and thermal expansion can still be maintained, but the dielectric properties may be undesirably affected; the variation in use amount of flame retardant (C7 to C9) not only changes flame retardancy but also affects impact strength, thermal expansion, thermal resistance and dielectric properties of the laminate; thermal resistance is worse for laminates without bismaleimide (C12) than those with bismaleimide (E9). From E4 and C13, it can be observed that, compared with bis(vinylbenzyl)-terminated PPO (OPE-2st), the use of polymerized and/or modified PPO can achieve higher impact strength.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A polyphenylene oxide resin having a structure represented by formula (I):

wherein b is a positive integer, X is selected from any one of formula (II) to formula (IV) and a combination thereof:

(II)

(III)

(IV)

Y has a structure represented by formula (V):

(V)

wherein m and n independently represent a positive integer of 1 to 30; $R_1$ to $R_{16}$ are independently selected from H, —$CH_3$ and halogen atoms; A is selected from —$CH_2$—, —$CH(CH_3)$—, —$C(CH_3)_2$—, —O—, —S—, —$SO_2$— and carbonyl group;
and Z has a structure of formula (VI) or (VIII) or a combination thereof:

(VI)

(VIII)

wherein $R_{17}$ to $R_{23}$ are independently selected from H, —$CH_3$ and halogen atoms, and W is an aliphatic group.

2. A method of preparing the polyphenylene oxide resin of claim 1, comprising reacting a bis(chloromethyl) compound with dihydroxyl-terminated polyphenylene oxide, followed by the addition of a vinyl compound to complete the reaction and obtain the polyphenylene oxide resin.

3. The method of claim 2, wherein the bis(chloromethyl) compound is selected from bis(chloromethyl)benzene, bis(chloromethyl)biphenyl, bis(chloromethyl)ether and a combination thereof.

4. The method of claim 2, wherein the dihydroxyl-terminated polyphenylene oxide has a structure represented by formula (XII):

(XII)

wherein m and n independently represent a positive integer of 1 to 30; $R_1$ to $R_{16}$ are independently selected from H, —$CH_3$ and halogen atoms; and A is selected from —$CH_2$—, —$CH(CH_3)$—, —$C(CH_3)_2$—, —O—, —S—, —$SO_2$— and carbonyl group.

5. The method of claim 2, wherein the vinyl compound is selected from 4-chloromethyl styrene, 3-chloromethyl styrene, 2-chloromethyl styrene, methacrylic acid, chloropropene, and a combination thereof.

6. A polyphenylene oxide prepolymer obtained from a pre-polymerization of the polyphenylene oxide resin of claim 1 with a double-bond-containing compound, a double-bond-containing resin or a mixture of a double-bond-containing compound and a double-bond-containing resin.

7. The polyphenylene oxide prepolymer of claim 6, wherein the double-bond-containing compound and the double-bond-containing resin are independently selected from isocyanate, isocyanurate, maleimide, polyolefin, divinylbenzene, acrylic resin and a combination of any two or more thereof.

8. A resin composition comprising: (A) the polyphenylene oxide resin of claim 1, its prepolymer or a mixture thereof; and (B) a property modifier for modifying at least one property of the resin composition comprising flame retardancy, thermal resistance, dielectric constant, dissipation factor, toughness, reactivity, viscosity and solubility.

9. The resin composition of claim 8, wherein the property modifier is selected from a group consisting of flame retardant, inorganic filler, olefin polymer, surfactant, toughener, curing accelerator, solvent and a combination thereof.

10. The resin composition of claim 8, further comprising isocyanate, modified isocyanate, isocyanurate, modified isocyanurate, maleimide, modified maleimide or a combination thereof.

11. The resin composition of claim 8, further comprising styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer or a combination thereof.

12. An article made from the resin composition of claim 8, which is a prepreg, a resin film, a laminate or a printed circuit board.

13. The polyphenylene oxide resin according to claim 1, wherein A is —C(CH$_3$)$_2$—.

* * * * *